July 25, 1961     H. A. PANISSIDI     2,993,477
REGENERATIVE HYDRAULIC CONTROL VALVE
Filed Dec. 17, 1958
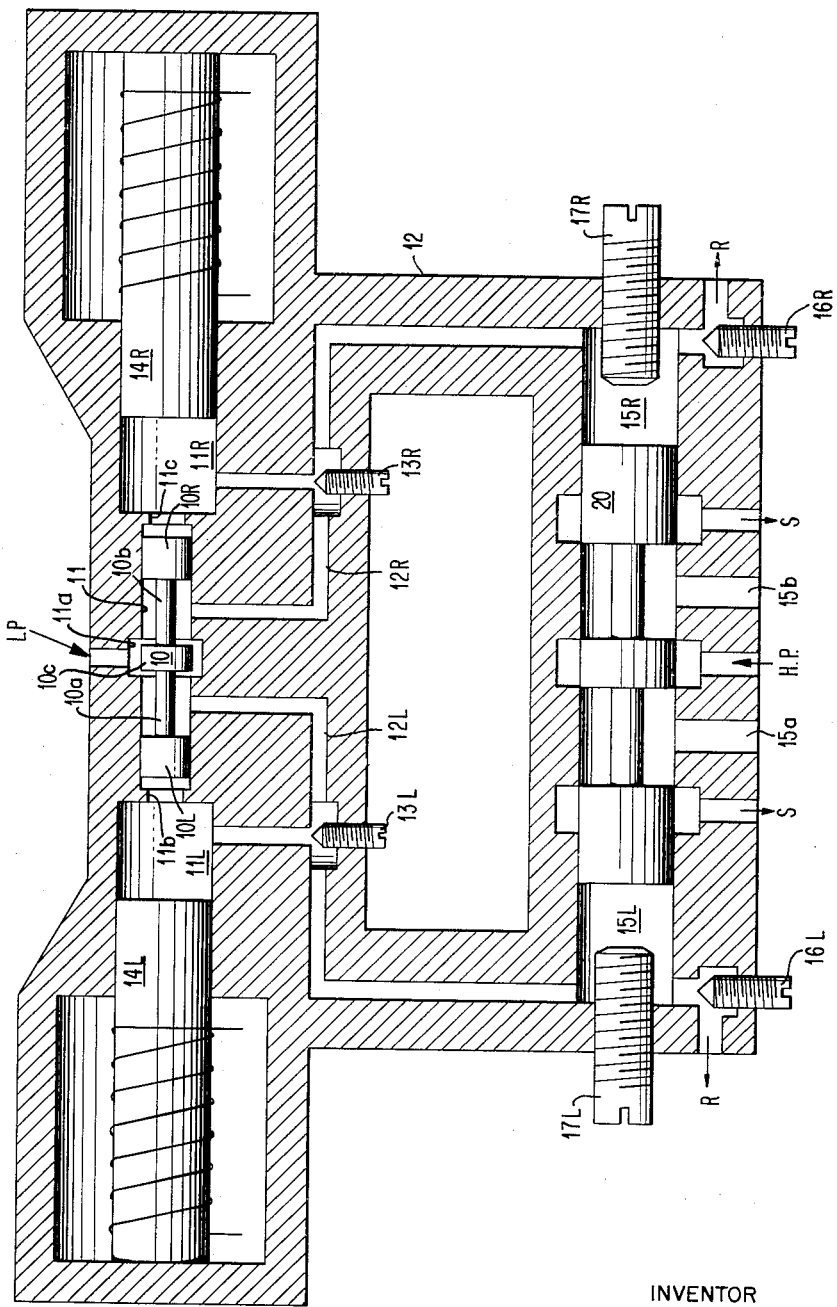
INVENTOR
HUGO A. PANISSIDI
BY *R.E. Sandt*
AGENT

2,993,477
REGENERATIVE HYDRAULIC CONTROL VALVE
Hugo A. Panissidi, Peekskill, N.Y., assignor to International Business Machines Corporation, New York, N.Y., a corporation of New York
Filed Dec. 17, 1958, Ser. No. 781,123
7 Claims. (Cl. 121—46.5)

This invention relates to fluid apparatus and more particularly to fluid control valves.

In applications wherein the selective control of hydraulic fluids is employed to effect a large number of different rapid mechanical movements, it is not only necessary that the valves for controlling the fluid flow be compact and economical of fabrication because of the large number of valves employed, but also that they be extremely fast in their response time. A further design criteria is frequently imposed by the necessity of the hydraulic system being compatible with the system in which it operates. In large scale electronic digital computing machines, for example, the input and output devices involve mechanical movements and hydraulics have been found useful in these applications. However, much of the electronic control circuitry is of a pulse nature and, consequently, it is a desideratum that any associated hydraulic equipment be controllable by electrical pulses generated by the electronic circuitry.

Accordingly, it is an object of this invention to provide a fluid control valve which acts responsive to a momentary impulse of short duration to control the flow of fluid in a desired path.

A further object is to provide a fluid control valve having an extremely rapid response time without requiring an undue quantity of input signal energy.

Yet another object is to provide a valve in accordance with the foregoing objects wherein the structure of the valve lends itself to economy of fabrication and housing within a compact space.

A still further object is to provide a fluid control valve wherein a continuous fluid flow through a pilot valve produces a balanced pressure on both sides of a secondary control valve so as to permit it to remain in its previously operated position, and wherein means are provided to momentarily disturb the balanced fluid flow through the pilot valve, which unbalanced flow is regeneratively fed to displace the pilot valve fully to create an unbalanced pressure in the secondary valve, which in moving restores the pilot valve to its neutral position by a fluid feedback.

A final and specific object of the invention is to produce a fluid control valve of economic and compact construction which is operable in response to a momentary control impulse to disturb the balance of fluid flow through a low mass pilot valve, which unbalanced flow produces a pressure unbalance which fully moves the pilot valve to its extreme position thus creating a maximum pressure differential which, when applied to a secondary valve, moves it to an extreme displaced position by virtue of which secondary valve movement a counter fluid flow is generated to restore the pilot valve to its balanced flow position.

Other objects of the invention will be pointed out in the following description and claims and illustrated in the accompanying drawing, which discloses, by way of example, the principle of the invention and the best mode, which has been contemplated of applying that principle.

In the drawings:

The single figure of the drawing is a cross-sectional view taken through the valve showing the pilot and the secondary valves and the ducts interconnecting them.

The present invention contemplates a high-speed control valve having a low mass pilot valve connected to a work circuit controlling valve or secondary valve having an appreciably greater mass. In the normal unoperated state, fluid flow from a source of low pressure, such as a pump, is divided in balanced flow through the pilot valve to pressure chambers at opposite ends of the secondary valve and returned to the pressure source. By this divided flow the pressures are balanced and opposed so that no movement of the pilot or secondary valves is effected. Perturbation means, operatively connected with the pilot valve, introduces a momentary unbalance in the pilot valve which, by virtue of its small mass, responds rapidly thereto to unbalance the previously balanced flow therethrough, which unbalance is regeneratively fed back to the pilot valve to cause a full movement thereof and a further unbalance in the flow. This unbalanced flow condition produces an unbalanced pressure in the pressure chambers disposed at opposite ends of the secondary valve, which pressure unbalance induces a movement of the secondary valve in the direction of the unbalanced pressure. Because of the greater mass of the secondary valve there is a time lag wherein its movement is delayed over that of the pilot valve. Once the secondary valve begins to move, a counterpressure and fluid flow is generated which offsets the unbalanced flow in the pilot valve and restores the pilot valve to its neutral unoperated position, the secondary valve remaining in its full operated position. A reverse operation of the pilot valve, however will produce an unbalanced flow in the opposite direction inducing a full stroke of the secondary valve in its opposite direction and restoring the pilot valve in the same fashion in the reverse direction. Thus, generally there is provided by this structure a hydraulic trigger having two stable states of operation in either of which states a flow of fluid from a second source through the secondary valve can control any desired work circuit as, for instance, a bi-directional hydraulic motor or a double-ended piston.

Specifically and with reference to the single figure of the drawings, the pilot valve 10 is slideably disposed in a cylindrical chamber 11 which chamber, together with all other chambers and ducts of the valve structure, are contained in the valve housing 12, which housing for illustrative simplicity has been shown as a unitary structure but in actuality would be composed of a plurality of parts joined in fluid-tight arrangement by suitable fastening devices. The pilot valve 10 is a conventional spool valve of three-land configuration having the lands 10L, 10R and 10C, joined by the reduced spindles 10a and 10b. The cylindrical chamber 11 has an enlarged central annular chamber 11a which is externally connected to the low-pressure port schematically identified as LP and an arrow indicative of the direction of fluid flow. The length of the annular chamber 11a is greater than the length of the central land 10c of the valve member 10 so that a leakage occurs around the land 10c for all positions of the valve. This leakage is bled off by the ducts 12R and 12L, which ducts lead to a return line identified by R through instrumentalities subsequently to be described. Thus, so long as the spool 10 occupies a central position, there will be a divided flow from LP equally into the ducts 12L and 12R. This equal flow, in accordance with the well-known principles of hydraulics, produces a balanced pressure on each side of the spool 10 so as to maintain its neutral position.

The two lands 10L and 10R of the pilot valve fit closely within the cylindrical bore 11 so as to be substantially in fluid-tight relationship thereto. The bore 11 is chambered down at both ends thereof so as to produce physical stops 11b and 11c for the spool valve 10. Two equal and opposite reaction chambers 11L and 11R are exposed to the ends of the spools 10L and 10R, respectively, so that any unbalance in these reaction chambers will be communicated to the spool valve 10 to produce a corresponding movement thereof. The reaction chambers 11L and 11R are respectively connected to the ducts 12L and 12R through the adjustable throttling valves 13L and 13R. Thus, in the balanced condition of the valve, the equally divided flow of the fluid from LP around the central spool 10c and into the ducts 12L and 12R will introduce fluid under equal pressure into the reaction chambers 11L and 11R so that the balanced condition of the valve remains undisturbed. Further disposed in coactive relationship with the reaction chambers 11L and 11R are perturbation means 14L and 14R, which means have been shown here as magnetostrictive elements having the capability of changing their physical dimensions upon the passage of an electric current therethrough. Other equivalent means such as piezo-electric crystals or coil-operated diaphragms could equally well be employed. For the purposes of the operation of this valve it is only necessary that the perturbation means 14L and 14R are capable of extremely rapid volumetric changes and further, that they be capable of producing both a positive and a negative volume change. Thus, in the illustrative embodiment the magnetostrictive element 14L would be positively pulsed to produce an increase in volume simultaneously with the element 14R's being negatively pulsed to produce a decrease in volume. With such a pulsing scheme and the resultant increase of volume in 14L and a decrease of volume in 14R, a corresponding pressure differential would be achieved in the chambers 11L and 11R; namely, that the pressure in 11L would rise and the pressure in the chamber 11R would decay. This pressure differential, by the very nature of the pulse technique, will be necessarily of a transitory nature and will be communicated directly to the spool valve 10, which valve will accordingly be disturbed an incremental distance to the right. The pressure pulses will be restricted to the chambers 12L and 12R by virtue of the throttling or attenuating action of the respective valves 13L and 13R so that substantially no increase in pressure in the duct 12L will be induced by the positive pulsing of 14L, nor will there be any decay in the pressure in the duct 12R by virtue of the negative pulsing of 14R. With the initial disturbance of the valve 10 to the right as above described, the similarly balanced flow into the ducts 12L and 12R is now slightly unbalanced so that the flow into 12L is increased and the flow into 12R is decreased by the displacement of the central land 10c in relation to the annular chamber 11a. This unbalanced flow now results in an increase in pressure in the duct 12L and a decrease in pressure in the duct 12R. Inasmuch as these ducts are respectively intercommunicating with the reaction chambers 11L and 11R, a corresponding pressure change will be manifested therein. It is to be noted that this pressure change is susceptible of being transmitted through the throttling valves 13L and 13R because the change is not of a pulse nature, which would be naturally attenuated by a throttling valve. This regenerative feedback of the pressure change which was initiated by the positive pulsing of 14L and negative pulsing of 14R will cause a further movement of the valve 10 to the right causing a greater unbalanced flow, a greater unbalanced pressure, and a consequent more forceful urging of the valve 10 to the right until such time as it contacts the stop 11c when its traverse is arrested. During the time that the pressure differential in 12L and 12R was increasing, the relative flow through these ducts was also respectively increasing and decreasing. The duct 12L is in communication with the pressure chamber 15L which in turn communicates through a second throttling valve 16L to the return line of the system. Similarly the duct 12R communicates with an equal and oppositely disposed pressure chamber 12R which in turn is exhausted through the throttling valve 16R to the return line. The pressure chambers 15L and 15R are a continuation of a cylindrical bore containing the secondary spool valve 20, and any pressure differential in these two chambers will effect a corresponding movement of the spool valve. Thus, in the foregoing example a rise in the pressure in the chamber 15L and a decay in the pressure in the chamber 15R would cause the spool valve 20 to be urged to the right. Because of the large mass of the spool valve 20, relative to the mass of the spool valve 10, the ratio of the masses being in the order of magnitude of 13:1, the acceleration of the spool valve 20 will be considerably less than that of the spool 10. The movement of the spool 20, therefore, to the right will lag considerably the movement of the pilot valve 10 to the right and, as a matter of fact, the pilot valve will have moved through its complete excursion to the right before any appreciable movement of the secondary valve spool 20 has even begun. When finally the spool 20 attains a substantial velocity, it will act as a pump tending to force the fluid out of the chamber 15R and pull fluid into the chamber 15L.

Inasmuch as the relative flow in the ducts 12L and 12R was initially produced by the unbalanced condition of the valve 10, the counterflow induced by rapid movement of valve 20 to the right will overcome this unbalanced flow. Because of the flow restriction of the throttling valves 16L and 16R, the counterflow of fluid induced by the secondary valve movement cannot be absorbed fully by the return line R although a redistribution of flow thereinto is effected. Also the flow induced by the valve 20 similarly effects a redistribution of the flow from LP around the central land 10c of the pilot valve and into the ducts 12L and 12R. It will be noted that the throttling valves 13L and 13R offer no restriction to flow from the pilot valve into the ducts 12L and 12R but act only to confine the perturbation pulses in the reaction chambers 11L and 11R. Thus the counterflow will now raise the pressure in the duct 12L to produce an unbalanced pressure to the left. This unbalanced pressure will be passed by the throttling valves 13L and 13R, as the pressure change is not of a pulse nature, and a corresponding pressure difference will be communicated to the reaction chambers 11R and 11L which, connected as they are with the pilot valve 10, will produce a corresponding movement thereof to the left. As the pilot valve 10 approaches the neutral position, the divided flow again becomes balanced. Thus the valve 10 is restored to its neutral position and the secondary valve 20 travels to its extreme righthand position where it contacts an adjustable physical stop 17R.

A similar stop 17L provides a stop for the spool 20 when it is moved to the left in a reverse operation. Once moved to either left or right position the valve 20 will remain there, as the balanced flow produces no pressure unbalance to disturb the position of the valve.

The secondary valve 20 is of conventional three-land balanced construction so that for a movement to the right, pressure from a source HP will be connected to a work circuit duct 15a, and the return duct 15b from the work circuit will be connected to the sink S. A corresponding lefthand movement of the secondary valve will connect HP with 15b and 15a with the sink in well-known fashion.

It is further contemplated that for certain applications the secondary valve 20 would be replaced by a simple piston having no valve functions whatsoever, and that the connections thereto would be effected by the addition of connected push rods led externally of the valve housing 12 through suitable fluid-tight glands as, for instance, axially disposed in the threaded adjustable stops 17L and 17R. In such a case, the piston 20 with its externally led rods would be directly connected to the device to be operated.

All of the throttling valves 13L, 13R, 15L and 16R are so constructed as to be adjustable. Not only is this necessary from the standpoint of balancing the flow through the system but, most particularly with respect to the valves 13L and 13R, the regenerative feedback is controlled thereby to prevent the system from going into a state of auto-oscillation. These adjustments are made by trial and error and are a function of the parameters of the system, including not only the geometry of the valve but also the magnetostrictive characteristics of the perturbation means as well as the properties and temperature of the hydraulic fluid that is employed.

With the pilot valve 10 restored to its neutral position as hereinabove described, and the secondary valve 20 in its righthand position abutting the stop 17R, a subsequent reverse operation of the pilot valve 10 to the left will produce an unbalanced flow in the ducts 12L and 12R and a consequent differential pressure in these ducts. Specifically as the magnetostrictive element 14R is now positively pulsed to produce an increase in the volume thereof and the magnetostrictive element 14L negatively pulsed to produce a decrease in the volume thereof, there will be a momentary increase in pressure in the reaction chamber 11R and a decrease in the chamber 11L. This momentary pressure change in the two chambers will produce an incrementally small movement of the pilot valve 10 to the left causing an unbalanced flow greater in the duct 12R than in the duct 12L. This unbalanced flow will produce a greater pressure in the duct 12R and a lesser pressure in the duct 12L, which pressures will be communicated to the reaction chambers 11R and 11L, respectively, through the throttling valves 13R and 13L. The consequent pressure changes in the chambers 11R and 11L will produce a further movement of the pilot valve 10 to the left and an increasing flow unbalance and a greater pressure differential to cause the valve 10 to move to its full extent to the left until it abuts the physical stop 11b. As in the reverse operation, the unbalanced pressures in the ducts 12R and 12L are communicated via the pressure chambers 15R and 15L to the secondary valve 20, which valve now in its righthand position begins to move to the left by virtue of the greater pressure in the chamber 15R. The movement of the valve 20 effects a pumping action whereby the fluid in the chamber 15L is pumped in the upward direction in the duct 12L, thus tending to restore the pilot valve 10 to its neutral position. Simultaneously therewith the fluid in the right pressure chamber 15R tends to be exhausted therefrom and the fluid in the duct 12R is moved downwardly by the left movement of the valve 20 to produce a decay in pressure on the righthand side of the valve 10, which adds to the restoring force of that valve. Because of the relationship of the masses of the pilot valve 10 and a secondary valve 20 and the adjustable throttling action of the throttling valves 13L, 13R, 16L and 16R the valve 10 will be restored to its neutral position without overtravel, which overtravel, were it to exist, would set the system into a self-excited state of oscillation, which oscillation would obviously be undesirable.

From the foregoing it can be seen that there has been provided a hydraulic servo valve which acts responsive to an initial perturbation of small magnitude to produce a full stroke of a secondary valve in the direction of the perturbation and a restoration of the pilot valve to its neutral position by a hydraulic feedback. The desired cyclic operation can be repeatedly effected so long as no two successive operations of the pilot valve in the same direction are attempted. As there would be no practical need for attempting a further operation of a work device in a direction which it already occupies, this presents no disadvantage. To obviate the condition wherein an operator might inadvertently provide two successive operations in the same direction, it is contemplated that the control circuits for energizing the magnetostrictive elements 14L and 14R in the form of electrical contacts responsive to the position of the work circuit would be added to eliminate the pulsing of the magnetostrictive elements in the same sense in two successive operations, or alternatively the operator would never produce two right operations or two left operations in succession.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A bistable fluid control valve comprising an inlet port having fluid supplied thereto from a source of pressure, a pair of ducts, a movable pilot valve member interconnecting said port and said ducts and adapted by its displacement to proportion the fluid flow from said port into said ducts, a pair of reaction chambers disposed in opposed fluid operative relationship to said movable valve member, means associated with each of said reaction chambers for controllably producing a momentary increase in volume in one of said chambers and a corresponding decrease in volume in the other of said chambers thereby moving the pilot valve toward the chamber having the decreased volume therein, flow restricting means connecting said reaction chambers and said ducts whereby the pressure existing in each of the ducts will be communicated to the respectively connected reaction chamber, a movable secondary valve adapted by its displacement to control a bi-directional fluid utilization device, a pair of pressure chambers respectively connected to said ducts and disposed in opposed operative relationship to said secondary valve whereby any pressure differential therebetween will effect a movement of said secondary valve member toward the chamber having the lesser pressure, and fluid discharge means, including flow restricting means connected to said pressure chambers, whereby the momentary volume change in the reaction chambers effects a movement of said pilot valve member to unbalance the flow of fluid in said ducts to thereby increase the pressure in the duct having the greater flow and a consequent greater pressure in the reaction chamber connected therewith to move the pilot valve further in the same direction and further unbalance the flow and pressure in the respective ducts, which pressure unbalance through the pressure chamber moves said secondary valve by virtue of which movement the unbalanced flow in said ducts is overcome and said pilot valve is returned to a balanced flow condition.

2. A regenerative fluid control valve comprising a pilot valve having a fluid inlet port and a pair of fluid discharge openings and including a movable valve member having a bi-directional freedom of movement from a neutral position wherein it is adapted to divide the flow from said port equally into said discharge openings, means for displacing said valve member from its neutral position to thereby unbalance the fluid flow in said discharge openings, means communicating with said openings and operative responsive to an unbalanced flow therethrough for further displacing said valve member in the same direction, a secondary valve adapted by its displacement to control fluid flow to a utilization device, means associated with said secondary valve and operative responsive to the unbalanced flow from said discharge openings for displacing said secondary valve, and means responsive to the velocity of movement of said secondary valve for restoring said pilot valve to its neutral flow balanced condition.

3. A fluid control valve comprising a movable pilot valve connected between a source of fluid pressure and a pair of discharge ports and adapted by its displacement to proportion the fluid flow from said fluid source to said discharge ports, a pair of ducts communicating with said discharge ports and having flow restricting means at the downstream ends thereof whereby the pressure in the respective ducts increases with an increased flow therethrough, a pair of reaction chambers in opposed fluid communication with said pilot valve and connected to said ducts by means of passages having flow restricting means disposed therein, means associated with said reaction chambers for increasing the volume of one and decreasing the volume of the other whereby the pilot valve is moved toward the chamber having the decreased volume thereby to increase the flow in that duct connected to the reaction chamber in which the volume is increased, and a movable secondary valve in fluid communication with said ducts upstream of said flow restricting means so as to be moved responsive to any unbalanced pressure in the said ducts by virtue of which movement the unbalanced flow in the said ducts is overcome so as to restore said pilot valve to a position wherein the flow from said fluid source is equally proportional into said ducts.

4. A fluid control valve comprising an inlet opening supplied with fluid under pressure, a pair of discharge ports, a pilot valve connecting said opening and said ports and having a movable flow controlling member which in a predetermined one position is adapted to divide the fluid flow from said opening equally into said discharge ports and in positions displaced from said predetermined position to divide the flow unequally to said ports, a pair of fluid ducts connected to said ports and having flow restriction means at the downstream ends thereof, a pair of reaction chambers in fluid communication with said movable flow controlling member but isolated from the fluid flowing in said pilot valve between said opening and said ports, fluid passages connecting said chambers and said ducts and having flow restricting means disposed therein, an impulse producing device disposed in each of said reaction chambers adapted to selectively increase the volume in one of said chambers and to decrease the volume in the other of said chambers thereby to move said movable flow controlling member toward the chamber having the decreased volume whereby the flow in said duct communicating with said chamber having the increased volume is increased so as to provide a further unbalanced pressure in the same direction acting upon said movable member, and a movable secondary valve member having an appreciably greater mass than said movable member of said pilot valve and disposed in fluid communication with said ducts so as to be moved in accordance with a pressure differential therebetween, the movable member of said secondary valve being so disposed and arranged that its movement responsive to a pressure differential in said ducts overcomes the pressure differential to re-establish said movable member of said pilot valve to its predetermined one position wherein the flow in the ducts is balanced.

5. A fluid control valve comprising, a fluid-tight housing; a first cylindrical bore therein; an inlet port supplied with fluid under pressure and communicating with said first bore medial of the length thereof; a pair of discharge ports in said bore symmetrically disposed with respect to and spaced from said inlet port; a symmetrical three-land spool valve slideably disposed in said bore to move therein between fixed limits, the center land of said spool valve being adapted to proportion the fluid flow from said inlet port to said discharge ports in accordance with the displacement of the spool valve and the end lands thereof being adapted to seal the ends of the bore from the fluid flowing between said inlet port and said discharge ports; a pair of chambers disposed at the ends of said first bore and communicating therewith; means in each of said chambers for momentarily and simultaneously increasing the volume in one chamber and decreasing the volume in the other chamber so as to cause said spool valve to move toward the chamber of lessened volume; a pair of internal ducts connected to said discharge openings and having adjustable flow restricting means at the ends thereof, the said ducts extending to the exterior of said housing downstream of said flow restricting means; a pair of passages including further adjustable flow restricting means connecting said chambers and said ducts downstream of said discharge ports; a second cylindrical bore in said housing open at the ends thereof to said ducts downstream of said passages, and upstream of said further adjustable flow restricting means; a secondary spool valve slideably disposed in said second bore and operative responsive to any pressure differential existing between said ducts to control by its displacement the fluid flow in a separate fluid circuit.

6. The fluid control valve of claim 5 wherein the mass of the movable spool in said second bore is at least ten times the mass of the spool operating in said first bore.

7. A fluid control valve comprising, a first displaceable valve connected between a source of fluid pressure and a pair of discharge ducts and adapted by its displacement to proportion the fluid flow from said source to said ducts, flow restricting means at the ends of said ducts whereby the pressure of the fluid flowing in said ducts is a function of the fluid flow therein, a second displaceable valve in pressure communication with said ducts and operative responsive to any pressure difference therein, pressure chambers disposed in opposed fluid communication with said first valve and connected to said ducts by passages including flow restricting means, and means in said pressure chambers for selectively increasing the volume of one chamber and decreasing the volume in the other chamber so that said first valve is displaced to increase the fluid flow in one duct and decrease the flow in the other duct which flow changes produce an unbalanced pressure to further displace said first valve to produce a further unbalanced flow and pressure differential in said ducts so that said secondary valve is moved toward the lower pressure which movement produces a counterflow to move said first valve to a position wherein the flow in the said ducts is balanced.

References Cited in the file of this patent

UNITED STATES PATENTS

| | | |
|---|---|---|
| 2,549,979 | Lane | Apr. 24, 1951 |
| 2,582,088 | Walthers | Jan. 8, 1952 |
| 2,709,421 | Avery | May 31, 1955 |
| 2,765,808 | Tydeman | Oct. 9, 1956 |
| 2,800,143 | Keller | July 23, 1957 |
| 2,803,110 | Chittenden | Aug. 20, 1957 |
| 2,823,689 | Healy | Feb. 18, 1958 |
| 2,835,265 | Brandstadter | May 20, 1958 |